United States Patent
Settels

(10) Patent No.: US 12,158,010 B2
(45) Date of Patent: Dec. 3, 2024

(54) PANEL, IN PARTICULAR A FLOOR PANEL OR A WALL PANEL

(71) Applicant: I4F Licensing NV, Turnhout (BE)

(72) Inventor: Daniël Casper Settels, 's-Hertogenbosch (NL)

(73) Assignee: i4F Licensing NV, Turnhout (BE)

( * ) Notice: Subject to any disclaimer, the term of this patent is extended or adjusted under 35 U.S.C. 154(b) by 214 days.

(21) Appl. No.: 17/775,015

(22) PCT Filed: Nov. 6, 2020

(86) PCT No.: PCT/EP2020/081373
§ 371 (c)(1),
(2) Date: May 6, 2022

(87) PCT Pub. No.: WO2021/089837
PCT Pub. Date: May 14, 2021

(65) Prior Publication Data
US 2022/0396953 A1 Dec. 15, 2022

(30) Foreign Application Priority Data

Nov. 8, 2019 (NL) .................................. 2024191

(51) Int. Cl.
*E04F 15/00* (2006.01)
*B32B 3/06* (2006.01)
(Continued)

(52) U.S. Cl.
CPC .......... *E04F 15/02038* (2013.01); *B32B 3/06* (2013.01); *B32B 5/02* (2013.01);
(Continued)

(58) Field of Classification Search
CPC .......... E04F 15/02033; E04F 15/02038; E04F 15/107; E04F 15/102; E04F 13/0866;
(Continued)

(56) References Cited

U.S. PATENT DOCUMENTS 10,794,065 B2 * 10/2020 Boo ...................... E04F 15/102
11,624,193 B2 * 4/2023 Boucké ............. E04F 15/02038
52/309.17
(Continued)

FOREIGN PATENT DOCUMENTS

CN 203924590 U 11/2014
DE 202011000194 U1 6/2011
(Continued)

*Primary Examiner* — Chi Q Nguyen
(74) *Attorney, Agent, or Firm* — The Webb Law Firm

(57) ABSTRACT

Provided is a panel including at least one first coupling part. The first coupling part includes an upward tongue, at least one upward flank lying at a distance from the upward tongue and an upward groove formed in between the upward tongue and the upward flank. The side of the upward tongue facing towards the upward flank is the inside of the upward tongue and the side of the upward tongue facing away from the upward flank is the outside of the upward tongue. At least a part of an upper side of the upward tongue is inclined relative to the plane of the panel, such that the upper side of the upward tongue includes a highest point. The upward tongue has a width, wherein the highest point of the upward tongue is arranged less than 50% of the width from the outside of the upward tongue.

20 Claims, 5 Drawing Sheets

(51) Int. Cl.
  *B32B 5/02* (2006.01)
  *B32B 27/08* (2006.01)
  *B32B 27/12* (2006.01)
  *B32B 27/20* (2006.01)
  *B32B 27/30* (2006.01)
  *E04F 13/08* (2006.01)
  *E04F 15/02* (2006.01)
  *E04F 15/10* (2006.01)

(52) U.S. Cl.
  CPC .............. *B32B 27/08* (2013.01); *B32B 27/12* (2013.01); *B32B 27/20* (2013.01); *B32B 27/304* (2013.01); *E04F 13/0866* (2013.01); *E04F 13/0894* (2013.01); *E04F 15/105* (2013.01); *E04F 15/107* (2013.01); *B32B 2255/10* (2013.01); *B32B 2307/412* (2013.01); *B32B 2307/554* (2013.01); *B32B 2307/558* (2013.01); *B32B 2307/72* (2013.01); *B32B 2419/00* (2013.01); *B32B 2451/00* (2013.01); *B32B 2471/00* (2013.01); *E04F 2201/0146* (2013.01); *E04F 2201/042* (2013.01); *E04F 2201/043* (2013.01)

(58) Field of Classification Search
  CPC ................ E04F 13/0894; E04F 15/105; E04F 2201/042; E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; B32B 3/06; B32B 5/02; B32B 27/08; B32B 27/12; B32B 27/20; B32B 27/304; B32B 2255/10; B32B 2307/412; B32B 2307/554; B32B 2307/558; B32B 2307/72; B32B 2419/00; B32B 2451/00; B32B 2471/00

See application file for complete search history.

(56) References Cited

U.S. PATENT DOCUMENTS

| | | | | |
|---|---|---|---|---|
| 11,639,605 | B2* | 5/2023 | Boucké | E04F 13/18 52/588.1 |
| 11,773,602 | B2* | 10/2023 | Boucké | B32B 15/046 52/177 |
| 11,788,302 | B2* | 10/2023 | Nilsson | B32B 9/04 52/588.1 |
| 2005/0028474 | A1* | 2/2005 | Kim | E04F 15/04 52/578 |
| 2008/0216435 | A1* | 9/2008 | Nolan | E04F 15/02 52/588.1 |
| 2021/0002907 | A1* | 1/2021 | Boucké | E04F 15/102 |
| 2023/0142257 | A1* | 5/2023 | Boucké | E04F 13/0894 52/588.1 |
| 2023/0183988 | A1* | 6/2023 | Boucké | E04F 15/105 52/588.1 |
| 2023/0220679 | A1* | 7/2023 | Boucké | C08L 27/06 52/588.1 |
| 2023/0304299 | A1* | 9/2023 | Boucké | E04F 15/10 |

FOREIGN PATENT DOCUMENTS

| | | |
|---|---|---|
| DE | 102013100345 A1 | 7/2014 |
| WO | 2014108129 A1 | 7/2014 |
| WO | 2016010414 A1 | 1/2016 |
| WO | 2016105266 A1 | 6/2016 |
| WO | 2019137964 A1 | 7/2019 |
| WO | 2019138365 A1 | 7/2019 |

* cited by examiner

PANEL, IN PARTICULAR A FLOOR PANEL OR A WALL PANEL

CROSS-REFERENCE TO RELATED APPLICATIONS

This application is the United States national phase of International Application No. PCT/EP2020/081373 filed Nov. 6, 2020, and claims priority to The Netherlands Patent Application No. 2024191 filed Nov. 8, 2019, the disclosures of which are hereby incorporated by reference in their entirety.

BACKGROUND OF THE INVENTION

Field of the Invention

The present invention relates to a panel, in particular a floor panel or a wall panel. The invention also relates to a covering, in particular a floor covering, ceiling covering, or wall covering, comprising a plurality of mutually coupled panels according to the invention.

Description of Related Art

The last decade has seen enormous advance in the market for laminate for hard floor covering. It is known to install floor panels on a underlying floor in various ways. It is, for example, known that the floor panels are attached at the underlying floor, either by gluing or by nailing them on. This technique has a disadvantage that is rather complicated and that subsequent changes can only be made by breaking out the floor panels. According to an alternative installation method, the floor panels are installed loosely onto the subflooring, whereby the floor panels mutually match into each other by means of a tongue and groove coupling, whereby mostly they are glued together in the tongue and groove, too. The floor obtained in this manner, also called a floating parquet flooring, has as an advantage that it is easy to install and that the complete floor surface can move which often is convenient in order to receive possible expansion and shrinkage phenomena. A disadvantage with a floor covering of the above-mentioned type, above all, if the floor panels are installed loosely onto the subflooring, consists in that during the expansion of the floor and its subsequent shrinkage, the floor panels themselves can drift apart, as a result of which undesired gaps can be formed, for example, if the glue connection breaks. In order to remedy this disadvantage, techniques have already been through of whereby connection elements made of metal are provided between the single floor panels in order to keep them together. Such connection elements, however, are rather expensive to make and, furthermore, their provision or the installation thereof is a time-consuming occupation. Floor panels having complementarily shaped coupling parts at opposing panel edges are also known. These known panels are typically rectangular and have complementarily shaped angling-down coupling parts at opposing long panel edges and complementarily shaped fold-down coupling parts at opposing short panel edges. Installation of these known floor panels is based upon the so-called fold-down technique, wherein the long edge of a first panel to be installed is firstly coupled to or inserted into the long edge of an already installed second panel in a first row, after which the short edge of the first panel is coupled to the short edge of an already installed third panel in a second row during lowering (folding down) the first panel, which installation fulfils the targeted requirement of a simple installation. In this manner a floor covering consisting of a plurality of parallel oriented rows of mutually coupled floor panels can be realized.

SUMMARY OF THE INVENTION

It is an object of the invention to provide a panel, wherein multiple panels can be mutually coupled in an improved manner.

The invention thereto provides a panel as described herein. An upper side of the upward tongue is inclined relative to the plane of the panel, such that the upper side of the upward tongue comprises a highest point. This inclination of the upper side of the upward tongue runs upwardly, from the inside of the upward tongue towards the outside of the upward tongue. At least a part of an upper side of the downward groove may also be inclined relative to the plane of the panel, such that the upper side of the downward groove comprises a highest point. This inclination of the upper side of the downward groove runs downward, from the downward flank towards the downward tongue.

The upward tongue may have a minimum, average or maximum width, as measured in the plane of the panel, wherein the highest point of the upward tongue is arranged less than 50%, preferably less than 25% of the width from the outside of the upward tongue. This configuration results in that the highest point of the upward tongue lies at or close to the outside of the upward tongue.

The downward groove may similarly also have a minimum, average or maximum width, as measured in the plane of the panel, wherein the highest point of downward groove is arranged less than 50%, preferably less than 25% of the width from the downward flank. This configuration results in that the highest point of the downward groove lies at or close to the downward tongue.

By providing the inclined upper side of the upward tongue, the upward tongue is thickest at the outside of the upward tongue. It is typically this side of the upward tongue that is most prone to damage during coupling and transportation, as it is the portion that sticks out the most. By having this side to be the thickest, a more robust coupling part can be created. By having the highest point relatively close to the outside, or even at the outside, of the upward tongue, this robustness is created.

Preferably, this (complete) upper surface has an inclined orientation, wherein more preferably this upper surface runs upwardly in a direction away from the upward flank. Hence, this inclined upper surface may also act as an aligning edge, which further facilitates coupling of panels. The wording "aligning edge" can be replaced by the wording "guiding edge" or "guiding surface". The upper surface of the upward tongue adjoins at an outer side surface of the upward tongue, said outer side surface being optionally provided with the first locking element. Said outer side surface preferably has a substantially vertical orientation. Thus, preferably the first locking element is located on a substantially vertical part of the upward tongue, such that above and below the locking element the upward tongue has a substantially vertically orientated surface.

The inclination of the upper surface or upper side of the upward tongue is preferably situated between 10 and 45 degrees, more preferably between 25 and 35 degrees, and is most preferably about 30 degrees, with respect to a horizontal plane or the plane of the panel. The inclination of the upper surface of the upward tongue is preferably constant, which means the upper surface has a flat orientation. Preferably, an upper side of the downward groove has a, preferably likewise (compared to the inclination of the upper surface of the upward tongue (if applied)), inclining orientation. A lower surface of a bridge connecting the downward tongue to the core is formed by the upper surface of the downward groove.

The highest point of the upward tongue may thus be closer to the outside of the upward tongue than the inside of the upward tongue and/or the highest point of the downward groove may be closer to the downward flank than the inside of the downward tongue. The highest point does thus not lie in the middle, nor is the highest point close to the upward groove or the downward tongue. As a result, the thickest portion of the upward tongue thus lies relatively close to the outside, or even at the outside, of the upward tongue. This feature can also replace the requirements of the upper sides of the upward tongue and downward groove, and the thickness requirements of the invention. In an alternative wording, the highest point of the upward tongue may be closer to the outside of the upward tongue compared to the upward groove and/or the highest point of the downward groove may be closer to the downward flank compared to the downward tongue.

In an embodiment a distance, in the plane of the panels, between the highest point of the upward tongue and the outside of the upward tongue and/or a distance, in the plane of the panels, between the highest point of the downward groove and the downward flank, is less than 0.1 times the thickness of the panel. This feature can also replace the requirements of the upper sides of the upward tongue and downward groove, and the thickness requirements of the invention.

The upper side of the upward tongue may be arranged between the inside and the outside of the upward tongue, and the inclined part of the upper side of the upward tongue may be a straight part. With straight is meant that the inclination is constant, and is not curved or rounded. This does not mean that the entire upper side of the upward tongue must have an inclined orientation which is constant.

At least a part of the inside of the upward tongue may be inclined towards the upward flank or at least a part of the inside of the upward tongue may be inclined away from the upward flank. At least a part of the inside of the downward tongue may be inclined towards the downward flank or at least a part of the inside of the downward tongue may be inclined away from the downward flank. The angle of inclination may lie between 0.5 and 10 degrees, wherein the angle is preferably measured compared to a direction perpendicular to the plane of the panel. Such inclined side, or inside, of the upward tongue creates the so-called "closed groove" system. Closed groove system, although often more difficult to couple together than the opposite, "open groove" systems, provide for a vertical and horizontal locking of two panels once coupled. With vertical and horizontal in this regard the direction described is intended to be relative to a horizontal (floor) plane. When the panel is a ceiling panel, the same vertical and horizontal locking references apply. When the panel is a wall panel, the locking is a horizontal locking and a back-and-forth locking, or an in-depth locking. The larger the angle of inclination, the bigger the locking effect and typically the harder the panels are to couple (and thus decouple).

The outside of the upward tongue may for instance comprise a first locking element and/or the downward flank may be provided with a second locking element, wherein preferably the first and second locking elements are adapted for co-action. A locking element contributes to the locking of coupled or locked panels. The first locking element could for instance be an outward bulge, and the second locking element may for instance be a(n inward) recess. Although other embodiments of locking elements may also be used, as long as the elements provide for some locking in some direction. Locking in this regard may include frictional engagement as well. In this latter embodiment, the at least one locking element of the first locking element and second locking element may be formed by a (flat of otherwise shaped) contact surface composed of a, optionally separate, plastic material configured to generate friction with the other locking element of another panel in engaged (coupled) condition. Examples of plastics suitable to generate friction include:

Acetal (POM), being rigid and strong with good creep resistance. It has a low coefficient of friction, remains stable at high temperatures, and offers good resistance to hot water;

Nylon (PA), which absorbs more moisture than most polymers, wherein the impact strength and general energy absorbing qualities actually improve as it absorbs moisture. Nylons also have a low coefficient of friction, good electrical properties, and good chemical resistance;

Polyphthalamide (PPA). This high performance nylon has through improved temperature resistance and lower moisture absorption. It also has good chemical resistance;

Polyetheretherketone (PEEK), being a high temperature thermoplastic with good chemical and flame resistance combined with high strength. PEEK is a favourite in the aerospace industry;

Polyphenylene sulphide (PPS), offering a balance of properties including chemical and high-temperature resistance, flame retardance, flowability, dimensional stability, and good electrical properties;

Polybutylene terephthalate (PBT), which is dimensionally stable and has high heat and chemical resistance with good electrical properties;

Thermoplastic polyimide (TPI) being inherently flame retardant with good physical, chemical, and wear-resistance properties.

Polycarbonate (PC), having good impact strength, high heat resistance, and good dimensional stability. PC also has good electrical properties and is stable in water and mineral or organic acids; and Polyetherimide (PEI), maintaining strength and rigidity at elevated temperatures. It also has good long-term heat resistance, dimensional stability, inherent flame retardance, and resistance to hydrocarbons, alcohols, and halogenated solvents.

When the bulge is arranged or placed into the recess, it is difficult to remove the bulge from the recess, in particular when combined with a "closed groove" locking system on the inside of the upward tongue. Providing the locking element on the outside of the upward tongue does provide for flexibility on the level (in height) where the locking element is arranged, and the location also allows the locking element to aid in preventing a rotational uncoupling or unlocking of two panels.

The outside of the downward tongue may comprise a third locking element and/or the upward flank may comprises a fourth locking element, wherein preferably the third and fourth locking elements are adapted for co-action. Separately, or in combination with the "closed groove" locking and/or the first and second locking element configuration, the panels may be provided with locking elements on the outside of the downward tongue and on the upward flank.

Again, the locking elements may be provided as a bulge/recess combination, although other embodiments of locking elements may also be used, as long as the elements provide for some locking in some direction. Locking in this regard may include frictional engagement as well.

The transition between the highest point of the upward tongue and the outside of the upward tongue may be rounded and/or the transition between the highest point of the downward groove and the downward flank may rounded. The advantage of rounded transition is that forces applied to the panels, in particular coupled panels, can be distributed more evenly with rounded or curved transition, and the occurrence of peak loads is less likely. This prevents, or counters, cracks to occur to at least some degree.

In coupled condition, a number of gaps may be present between the panels, preferably selected from the group of a gap between the outside of the downward tongue and the upward flank; a gap between the outside of the upward tongue and the downward flank; a gap between the upward tongue and the downward groove; a gap between the downward tongue and the upward groove; a gap between the highest point of the upward tongue and the highest point of the downward groove; and a gap underneath the upward tongue, extending towards the downward flank. The intentional presence of gaps serves a number of potential purposes. For one, it allows for somewhat larger tolerances when shaping or milling the coupling parts. If one of the parts is slightly too large for instance, the gap may be used to accommodate that slight oversized element. Furthermore these gaps may be used to store either foreign material or scratched and shaved off core material, for instance released from the panels during coupling.

The core may comprise a composite material, preferably selected from the group of: a mineral material, for instance magnesium oxide based, and a synthetic material, for instance a thermoplastic material, wherein the amount of mineral material is at least 50% of the core material, preferably at least 60 or 70%; a filler material, such as chalk or dust, and a synthetic material, such as a thermoplastic material, wherein the amount of filler material is at least 50% of the core material, preferably at least 60 or 70%; or an extruded composite, wherein for instance two different materials are mixed and then extruded.

The first coupling part may comprises a first bridge part, arranged between the core and the upward tongue, and the second coupling part may comprises a second bridge part, arranged between the core and the downward tongue. The first bridge part may comprise a weakened zone of reduced thickness, to facilitate deformation of the first bridge part during coupling and/or the second bridge part may comprises a weakened zone of reduced thickness, to facilitate deformation of the second bridge part during coupling, wherein in particular the second bridge part is thinnest closest to the core. With thinnest closest to the core is intended that, following the bridge part from the core towards the tongue part, along the plane of the panel, the thickness of the second bridge part increases. This typically occurs when the highest point of the downward groove is at the transition between the downward groove and the downward flank.

The outside of the upward tongue may be located at a distance, measured in the plane of the panel, from the upward flank, wherein the distance may be less than the thickness of the core. The distance between the upward tongue and the outside of the upward tongue may typically comprise the length of the bridge part and the thickness of the upward tongue. The claimed, relatively small, distance allows for a relative compact coupling part, and saves material which needs to be removed when the coupling parts would for instance be milled from a core material plank.

The panel may be elongated, wherein the first and second coupling parts are present on the short sides of the panel. Preferably the long sides are provided with an angling down locking profile or are also provided with the first and second coupling parts. The locking profiles or locking solutions proposed are useful in several styles of panels, but particularly useful in elongated panels similar to laminate flooring. The proposed locking profiles for instance work especially well as a drop-lock locking profile, which combines a vertical or downward motion on the short sides with an angling motion on the long sides. Together, a form of zipping motion can be used to easily couple panels together.

The upward flank may be provided with a substantially sideward groove for accommodating a sideward tongue and/or the outside of the downward tongue may be provided with a sideward tongue arranged to be accommodated in a sideward groove. This allows two panels to be coupled by a turning, pivoting or angling motion, wherein the sideward tongue is placed partly into the sideward groove at an angle, and the panels are mutually angled. Since the upper side of the upward tongue is inclined, and increases in size towards the outside of the tongue, the thickest portion of the upward tongue may be encountered relatively late in the angling process, which facilitates coupling. To distinguish the sideward tongue and sideward groove from the downward tongue and upward flank, a vertical plane can be used. At the top of the connection of two panels, the panels touch. At that point, a vertical line can be drawn, or a line perpendicular to the plane of the panel. Any part protruding from that line (outwardly for the sideward tongue, inwardly for the sideward groove) can be considered to be part of the sideward tongue or groove.

It is imaginable that the first coupling profile (and/or third coupling profile) and the second coupling profile (and/or fourth coupling profile) are configured such that in coupled condition a pretension is existing, which forces coupled panels at the respective edges towards each other, wherein this preferably is performed by applying overlapping contours of the first coupling profile (and/or third coupling profile) and the second coupling profile (and/or fourth coupling profile), in particular overlapping contours of downward tongue and the upward groove and/or overlapping contours of the upward tongue and the downward groove, and wherein the first coupling profile (and/or third coupling profile) and the second coupling profile (and/or fourth coupling profile) are configured such that the two of such panels can be coupled to each other by means of a fold-down movement and/or a vertical movement, such that, in coupled condition, wherein, in coupled condition, at least a part of the downward tongue of the second coupling profile (and/or fourth coupling profile) is inserted in the upward groove of the first coupling profile (and/or third coupling profile), such that the downward tongue is clamped by the first coupling profile (and/or third coupling profile) and/or the upward tongue is clamped by the second coupling profile (and/or fourth coupling profile).

The pretension referred to means that the coupling parts exert forces onto each other in coupled condition, which are such that the coupling parts, and hence the respective panels at the respective edges are forced (pushed) towards each other, wherein the first coupling part and the complementary second coupling part mutually cooperate in a clamping manner. This will significantly improve the stability and reliability of the coupling of the first coupling part and the second coupling part, and will prevent the coupling parts from drifting apart (which would create a gap in between adjacent panels), while maintaining the big advantage that the panels are configured to be coupled by means of a fold-down movement and/or vertical movement, also referred to as a scissoring movement or zipping movement, and hence by using the user-friendly fold-down technology. The pretension is preferably realized by using overlapping contours of the first coupling part and the second coupling part, in particular overlapping contours of the downward tongue and the upward groove and/or overlapping contours of the upward tongue and the downward groove. Overlapping contours doesn't mean that the complete contour should overlap, and merely requires that at least of part of the (outer) contour of the first coupling part overlaps with at least a part of the (outer) contour of the second coupling part. The contours are typically compared by considering the contours of the first coupling part and the second coupling part from a side view (or cross-sectional view). By applying overlapping contours, the first coupling part and/or the second coupling part will typically remain (elastically) deformed, in particular squeezed and/or bent, in a coupled state, provided the desired stability of the coupling. Normally, with overlapping contours the downward tongue will be (slightly) oversized with respect to the upward groove, and/or the upward tongue will be (slightly) oversized with respect to the downward groove. However, it should be understood that overlapping contours may also be realized in another manner, for example by applying overlapping first and second locking elements.

During coupling of the panels, the upward tongue may be (elastically) deformed, in particular squeezed and/or bent. Bending will take place from its initial position (slightly) in outward direction, away from the upward flank. A bent state of the upward tongue may remain in the coupled state of two panels. The bending angle of the proximal side of the upward tongue, facing the upward flank, will commonly be restricted and situated in between 0 and 2 degrees.

The oversize should be sufficiently large to realize the desired pretension, which pretension normally takes place already at a minimum oversize, though should at the other hand preferably be sufficiently limited to allow and secure proper and user-friendly installation. Preferably, the width of the downward tongue is oversized with respect to the width of the upward groove. This oversize is typically in the order magnitude of 0.05-0.5 mm. The maximum width of the downward tongue preferably exceeds the maximum width of the upward groove. This will commonly further contribute to keeping the panels push to each other to keep the coupling, and hence the seam, as tight (free of play) as possible. In order to secure the panels in a single (horizontal) plane, it is advantageous in case the height of the downward tongue is equal to or smaller than the height of the upward groove.

As already indicated, it is also conceivable that the upward tongue is oversized with respect to the downward groove. Preferably, the width of the upward tongue is oversized with respect to the width of the downward groove. Here, it is more preferred the maximum width of the upward tongue exceeds the maximum width of the downward groove, which also leads to pretension between the first coupling part and second coupling part. However, in this case it is preferred that the downward groove is not widened during coupling, or at least does not remain widened in coupled condition, in order to secure a tight seam between the panels and the prevent an offset between the panels. In case the panels edges are chamfered, in particular bevelled, a small offset will not be visible though, which therefore allow a small offset (due to (slight) widening of the downward groove and upward bending of the downward tongue in coupled condition). The height of the upward tongue is preferably equal to or smaller than the height of the downward groove. This will facilitate the keep coupled panels are the same level (within a joint (horizontal plane).

The core may for instance be made of a composite layer comprising at least one magnesium oxide (magnesia) and/or magnesium hydroxide based composition, in particular a magnesia cement; particles, in particular cellulose based particles, dispersed in said magnesia cement; and, preferably, at least one reinforcement layer embedded in said composite layer. It has been found that the application of a magnesium oxide and/or magnesium hydroxide based composition, and in particular a magnesia cement, significantly improves the inflammability (incombustibility) of the decorative panel as such. Moreover, the relatively fireproof panel according to the invention also has a significantly improved dimensional stability when subject to temperature fluctuations during normal use. Magnesia based cement is cement which is based upon magnesia (magnesium oxide), wherein cement is the reaction product of a chemical reaction wherein magnesium oxide has acted as one of the reactants. In the magnesia cement, magnesia may still be present and/or has undergone chemical reaction wherein another chemical bonding is formed, as will be elucidated below in more detail. Additional advantages of magnesia cement, also compared to other cement types, are presented below. A first additional advantage is that magnesia cement can be manufactured in a relatively energetically efficient, and hence cost efficient, manner. Moreover, magnesia cement has a relatively large compressive and tension strength. Another advantage of magnesia cement is that this cement has a natural affinity for—typically inexpensive—cellulose materials, such as plant fibres wood powder (wood dust) and/or wood chips; This not only improves the binding of the magnesia cement, but also leads a weight saving and more sound insulation (damping). Magnesium oxide when combined with cellulose, and optionally clay, creates magnesia cements that breathes water vapour; this cement does not deteriorate (rot) because this cement expel moisture in an efficient manner. Moreover, magnesia cement is a relatively good insulating material, both thermally and electrically, which makes the panel according to the invention in particularly suitable for flooring for radar stations and hospital operating rooms. An additional advantage of magnesia cement is that it has a relatively low pH compared to other cement types, which all allows major durability of glass fibre either as dispersed particles in cement matrix and/or (as fiberglass) as reinforcement layer, and, moreover, enables the use other kind of fibres in a durable manner. Moreover, an additional advantage of the decorative panel is that it is suitable both for indoor and outdoor use.

In an embodiment of a pane according to the invention, the magnesia based composition, in particular the magnesia cement, comprises magnesium chloride (MgCl2). Typically, when magnesia (MgO) is mixed with magnesium chloride in an aqueous solution, a magnesia cement will be formed which comprises magnesium oxychloride (MOC). The bonding phases are Mg(OH)2, 5Mg(OH)2·MgCl2·8H2O (5-form), 3Mg(OH)2·MgCl2·8H2O (3-form), and Mg2(OH)ClCO3·3H2O. The 5-form is the preferred phase, since this phase has superior mechanical properties. Related to other cement types, like Portland cement, MOC has superior properties. MOC does not need wet curing, has high fire resistance, low thermal conductivity, good resistance to abrasion. MOC cement can be used with different aggregates (additives) and fibres with good adherence resistance. It also can receive different kinds of surface treatments. MOC develops high compressive strength within 48 hours (e.g. 8,000-10,000 psi). Compressive strength gain occurs early during curing—48-hour strength will be at least 80% of ultimate strength. The compressive strength of MOC is preferably situated in between 40 and 100 N/mm2. The flexural tensile strength is preferably 10-17 N/mm2. The surface hardness of MOC is preferably 50-250 N/mm2. The E-Modulus is preferably 1-3 104 N/mm2. Flexural strength of MOC is relatively low but can be significantly improved by the addition of fibres, in particular cellulose based fibres. MOC is compatible with a wide variety of plastic fibres, mineral fibres (such as basalt fibres) and organic fibres such as bagasse, wood fibres, and hemp. MOC used in the panel according to the invention may be enriched by one or more of these fibre types. MOC is non-shrinking, abrasion and acceptably wear resistant, impact, indentation and scratch resistant. MOC is resistible to heat and freeze-thaw cycles and does not require air entrainment to improve durability. MOC has, moreover, excellent thermal conductivity, low electrical conductivity, and excellent bonding to a variety of substrates and additives, and has acceptable fire resistance properties. MOC is less preferred in case the panel is to be exposed to relatively extreme weather conditions (temperature and humidity), which affect both setting properties but also the magnesium oxychloride phase development. Over a period of time, atmospheric carbon dioxide will react with magnesium oxychloride to form a surface layer of $Mg_2(OH)ClCO_3 \cdot 3H_2O$. This layer serves to slow the leaching process. Eventually additional leaching results in the formation of hydromagnesite, $4MgO \cdot 3CO_3 \cdot 4H_2O$, which is insoluble and enables the cement to maintain structural integrity.

The core may at least partially made of at least one polymer, in particular a thermoplastic material and/or a thermoset material, wherein, preferably, the core comprises a composite comprising at least one polymer, in particular a thermoplastic material and/or a thermoset material, and at least one non-polymeric material. Said non-polymeric material preferably at least one material selected from the group consisting of: steel, glass, polypropylene, wood, acrylic, alumina, curaua, carbon, cellulose, coconut, kevlar, nylon, perlon, rock wool, sisal, fique, a mineral filler, in particular chalk. This may further increase the strength of the panel and/or the water resistivity and/or the fireproof properties of the panel as such, and/or may lower the cost price of the panel as such.

A preferred thermoplastic material is PVC, PET, PP, PS or (thermoplastic) PUR. PS may be in the form of expanded PS (EPS) in order to further reduce the density of the panel, which leads to a saving of costs and facilitates handling of the panels. Preferably, at least a fraction of the polymer used may be formed by recycled thermoplastic, such a recycled PVC. It is also imaginable that rubber and/or elastomeric parts (particles) are dispersed within at least one composite layer to improve the flexibility and/or impact resistance at least to some extent.

Preferably, the core comprises from 50% of its weight up to 100% of its weight of thermoplastic material. The core may comprise at least one plasticizer to increase the flexibility of the panel as such. In a preferred embodiment the areal density of the core is less than 9000 g/m2, preferably less than 6000 g/m2.

The composite of the core layer may comprise at least one filler selected from the group consisting of: a salt, a stearate salt, calcium stearate, and zinc stearate. Stearates have the function of a stabilizer, and lead to a more beneficial processing temperature, and counteract decomposition of components of the composite during processing and after processing, which therefore provide long-term stability. Instead of or in addition to a stearate, for example calcium zinc may also be used as stabilizer. The weight content of the stabilizer(s) in the composite will preferably be between 1 and 5%, and more preferably between 1.5 and 4%.

The composite of the core layer may also comprise at least one impact modifier comprising at least one alkyl methacrylates, wherein said alkyl methacrylate is preferably chosen from the group consisting of: methyl methacrylate, ethyl methacrylate, propyl methacrylate, isopropyl methacrylate, t-butyl methacrylate and isobutyl methacrylate. The impact modifier typically improves the product performance, in particular the impact resistance. Moreover, the impact modifier typically toughens the core layer and can therefore also be seen as toughening agent, which further reduces the risk of breakage. Often, the modifier also facilitates the production process, for example, as already addressed above, in order to control the formation of the foam with a relatively consistent (constant) foam structure. The weight content of the impact modifier in the composite will preferably be between 1 and 9%, and more preferably between 3 and 6%. Preferably, the substantially complete core layer is formed by either a foamed composite or a non-foamed (solid) composite. At least one plastic material used in the core layer is preferably free of any plasticizer in order to increase the desired rigidity of the core layer, which is, moreover, also favourable from an environmental point of view.

The density of the core layer typically varies from about 0.1 to 1.5 grams/cm3, preferably from about 0.2 to 1.4 grams/cm3, more preferably from about 0.3 to 1.3 grams/cm3, even more preferably from about 0.4 to 1.2 grams/cm3, even more preferably from about 0.5 to 1.2 grams/cm3, and most preferably from about 0.6 to 1.2 grams/cm3.

The panel may be provided with a decorative top structure. The decorative top structure preferably comprises at least one decorative layer and at least one transparent wear layer covering said decorative layer. The decorative top structure may additionally comprise at least one back layer situated in between said decorative layer and the core, wherein said back layer is preferably made of a vinyl compound. A lacquer layer or other protective layer may be applied on top of said wear layer. A finishing layer may be applied in between the decorative layer and the wear layer. The decorative layer will be visible and will be used to provide the panel an attractive appearance. To this end, the decorative layer may have a design pattern, which can, for example be a wood grain design, a mineral grain design that resembles marble, granite or any other natural stone grain, or a colour pattern, colour blend or single colour to name just a few design possibilities. Customized appearances, often realized by digital printing during the panel production process, are also imaginable. The decorative top structure may also be formed by a single layer. In an alternative embodiment, the decorative top structure is omitted, thus not applied, in the panel according to the invention. In this latter embodiment, the upper side of the core constitutes the upper side of the panel.

The decorative layer may be formed by a printed thermoplastic layer or printed thermoplastic film. The thermoplastic material is used can be of various nature, but commonly PVC is preferred as material. The decorative layer may also be formed by an ink layer printed, preferably digitally printed, either directly or indirectly onto the core.

The decorative top structure may also comprise and/or constitute a carpet base having pile yarns projecting upwardly therefrom. The pile yarns can be made from a number of natural or synthetic fibres. Many types of yarn are made differently though, wherein there are typically two main types of yarn: spun and filament. The yarns may be made of nylon but other suitable synthetic yarns such as polyester, polypropylene, acrylic or blends thereof can be employed. The carpet tile may be either rigid or flexible. It is also conceivable that the base is free of any yarn or fibres. The pile yarns may consist of loop piles. It is however also possible that the pile yarns consist of cut piles, twisted piles or any other suitable pile yarns in for example a level- or multilevel configuration. The loop piles are possibly synthetic yarns, such as nylon, polyester, polypropylene, acrylic or blends thereof. In the shown embodiment, the loop piles are tufted in the carpet base. The carpet base preferably also comprises a backing sheet, which can for example be a non-woven sheet, a woven sheet, a non-woven polyester sheet, a polypropylene sheet, a glass fibre scrim or tissue sheet or combinations thereof. The backing sheet typically acts as support structure (holding structure) for holding the yarns. To more efficiently bond the tufts in position on the carpet base, and in particular on the backing sheet, preferably a pre-coat layer is applied. This pre-coat layer can for example be a latex layer.

The lower part of the first coupling part that is located between a side of the upward tongue facing away from the upward flank and the upward flank may be the bottom part of the first coupling part, and the bottom part of the first coupling part may comprise a recessed portion, in particular a recessed portion extending between the upward flank and the side of the upward tongue facing away from the upward flank; wherein the recessed portion is configured to allow downward movement of the upward tongue, into the recessed portion, during coupling of two adjacent panels, preferably such that the upward groove is temporarily widened to facilitate coupling of two panels. The recessed portion may for instance be formed by a milled out groove, that when the panel is placed on a horizontal subfloor or surface, also extends in horizontal direction. Alternatively, the groove extends from a distance of the bottom side of the panel.

The side of the upward tongue facing away from the upward flank may be located at a distance from the upward flank; wherein the distance is less than the thickness of the core; and the recess portion extends at least 75% of the distance and preferably extends over the complete distance. By having the distance between the outside of the upward tongue and the upward flank arranged to be less than the thickness of the core, a relative short protruding element is produced, which limits the vulnerability of the coupling parts. On the other hand, by having the recessed portion to extend over a large portion of the distance, several benefits may be achieved. For one, this allows for relative much material savings. The material which is removed in order to form the recessed portion can be recycled in new panels, and by removing more material, more material can be reintroduced in the system. Secondly, the relatively large recess allows a gradual bending of the upward tongue, as the bending can be spread out over a larger surface area.

The invention further relates to a covering, in particular a floor covering, ceiling covering, or wall covering, comprising a plurality of mutually coupled panels according to the invention.

Preferred embodiments of the invention are set out in the non-limitative set of clauses presented below:

1. Panel (1), in particular a floor panel or a wall panel, comprising:
   a centrally located core (2) provided with an upper side (2a) and a lower side (2b), which core (2) defines a plane (P); wherein the distance between the upper side (2a) and the lower side (2b) defines a thickness (T) of the panel (1);
   at least one first coupling part (3) and at least one second coupling part (4) arranged on opposite sides of the core (2), wherein the first coupling part (3) and the second coupling part (4) of another panel (1) are arranged to be coupled with a downward, angling or vertical motion;
   wherein the first coupling part (3) comprises an upward tongue (7), at least one upward flank (8) lying at a distance from the upward tongue and an upward groove (9) formed in between the upward tongue (7) and the upward flank (8), wherein the upward groove (9) is adapted to receive at least a part of a downward tongue (10) of a second coupling part (4) of another panel (1), wherein the side of the upward tongue (7) facing towards the upward flank (8) is the inside of the upward tongue (7) and the side of the upward tongue (7) facing away from the upward flank (8) is the outside of the upward tongue (7);
   wherein the second coupling part (4) comprises a downward tongue (10), at least one downward flank (11) lying at a distance from the downward tongue (10), and a downward groove (12) formed in between the downward tongue (10) and the downward flank (11), wherein the downward groove (12) is adapted to receive at least a part of an upward tongue (7) of a first coupling part (3) of another panel (1), wherein the side of the downward tongue (10) facing towards the downward flank (11) is the inside of the downward tongue (10) and the side of the downward tongue (10) facing away from the downward flank (11) is the outside of the downward tongue (10);
   wherein at least a part of an upper side (13) of the upward tongue (7) is inclined relative to the plane (P) of the panel (1), such that the upper side (13) of the upward tongue comprises a highest point (14), and/or wherein at least a part of an upper side (15) of the downward groove (12) is inclined relative to the plane (P) of the panel (1), such that the upper side (15) of the downward groove (12) comprises a highest point (16).

2. Panel (1) according to clause 1, wherein:
   (i) the upward tongue (7) has a minimum, average or maximum width, as measured in the plane (P) of the panel, wherein the highest point of the upward tongue (7) is arranged less than 50%, preferably less than 25% of the width from the outside of the upward tongue, and/or wherein the downward groove (12) has a minimum, average or maximum width, as measured in the plane (P) of the panel, wherein the highest point of downward groove (12) is arranged less than 50%, preferably less than 25% of the width from the downward flank (11); and/or
   (ii) the highest point (14) of the upward tongue (7) is closer to the outside of the upward tongue (7) than the inside of the upward tongue (7) and/or wherein the highest point (16) of the downward groove (12) is closer to the downward flank (11) than the inside of the downward tongue (10).

3. Panel (1) according to any of the preceding clauses, wherein a distance, in the plane (P) of the panels (1), between the highest point (14) of the upward tongue (7) and the outside of the upward tongue (7) and/or a distance, in the plane (P) of the panels (1), between the highest point (16) of the downward groove (12) and the downward flank (11), is less than 0.1 times the thickness of the panel (1).

4. Panel (1) according to any of the preceding clauses, wherein the upper side (13) of the upward tongue (7) is arranged between the inside and the outside of the upward tongue (7), and wherein the inclined part of the upper side (13) of the upward tongue (7) is a straight part.

5. Panel (1) according to any of the preceding clauses, wherein at least a part of the inside of the upward tongue (7) is inclined towards the upward flank (8) or wherein at least a part of the inside of the upward tongue (7) is inclined away from the upward flank (8), wherein the angle of inclination lies between 0.5 and 10 degrees, wherein the angle is preferably measured compared to a direction perpendicular to the plane (P) of the panel (1).

6. Panel (1) according to any of the preceding clauses, wherein the outside of the upward tongue (7) comprises a first locking element (17) and/or wherein the downward flank (11) is provided with a second locking element (18), wherein preferably the first and second locking elements (17, 18) are adapted for co-action.

7. Panel (1) according to any of the preceding clauses, wherein the outside of the downward tongue (10) comprises a third locking element (19) and/or wherein the upward flank (8) comprises a fourth locking element (20), wherein preferably the third and fourth (19, 20) locking elements are adapted for co-action.

8. Panel (1) according to any of the preceding clauses, wherein the transition between the highest point (14) of the upward tongue (7) and the outside of the upward tongue is rounded and/or the transition between the highest point (16) of the downward groove (12) and the downward flank (11) is rounded.

9. Panel (1) according to any of the preceding clauses, wherein in coupled condition a number of gaps (21) are present between the panels (1), preferably selected from the group of:
   a) a gap between the outside of the downward tongue and the upward flank;
   b) a gap between the outside of the upward tongue and the downward flank;
   c) a gap between the upward tongue and the downward groove;
   d) a gap between the downward tongue and the upward groove;
   e) a gap between the highest point of the upward tongue and the highest point of the downward groove;
   f) a gap underneath the upward tongue, extending towards the downward flank.

10. Panel (1) according to any of the preceding clauses, wherein the core (2) comprises a composite material, preferably selected from the group of:
   a) a mineral material, for instance magnesium oxide based, and a synthetic material, for instance a thermoplastic material, wherein the amount of mineral material is at least 50% of the core material, preferably at least 60 or 70%;
   b) a filler material, such as chalk or dust, and a synthetic material, such as a thermoplastic material, wherein the amount of filler material is at least 50% of the core material, preferably at least 60 or 70%;
   c) an extruded composite, wherein for instance two different materials are mixed and then extruded.

11. Panel (1) according to any of the preceding clauses, wherein the first coupling part (3) comprises an first bridge part (25), arranged between the core (2) and the upward tongue (7), and wherein the second coupling part (4) comprises a second bridge part (26), arranged between the core (2) and the downward tongue (10), wherein the first bridge part (25) comprises a weakened zone of reduced thickness, to facilitate deformation of the first bridge part (25) during coupling and/or wherein the second bridge part (26) comprises a weakened zone (27) of reduced thickness, to facilitate deformation of the second bridge part (26) during coupling, wherein in particular the second bridge part is thinnest closest to the core.

12. Panel (1) according to any of the preceding clauses, wherein the outside of the upward tongue (7) is located at a distance (D), measured in the plane (P) of the panel, from the upward flank (8), wherein the distance (D) is less than the thickness (T) of the core (2).

13. Panel (1) according to any of the preceding clauses, wherein the panel is elongated, and wherein the first and second coupling parts are present on the short sides of the panel, wherein preferably the long sides are provided with an angling down locking profile or are also provided with the first and second coupling parts.

14. Panel (1) according to any of the preceding clauses, wherein the highest point (14) of the upward tongue (7) is closer to the outside of the upward tongue (7) compared to the upward groove (9) and/or wherein the highest point (16) of the downward groove (12) is closer to the downward flank (11) compared to the downward tongue (10).

15. Panel (1) according to any of the preceding clauses, wherein the upward flank is provided with a substantially sideward groove (22) for accommodating a sideward tongue (23) and/or wherein the outside of the downward tongue (10) is provided with a sideward tongue (23) arranged to be accommodated in a sideward groove (22).

16. Covering, in particular a floor covering, ceiling covering, or wall covering, comprising a plurality of mutually coupled panels according to any of the previous clauses.

BRIEF DESCRIPTION OF THE DRAWINGS

The invention will be elucidated on the basis of non-limitative exemplary embodiments shown in the following figures. Herein.

DESCRIPTION OF THE INVENTION

Figure 1:
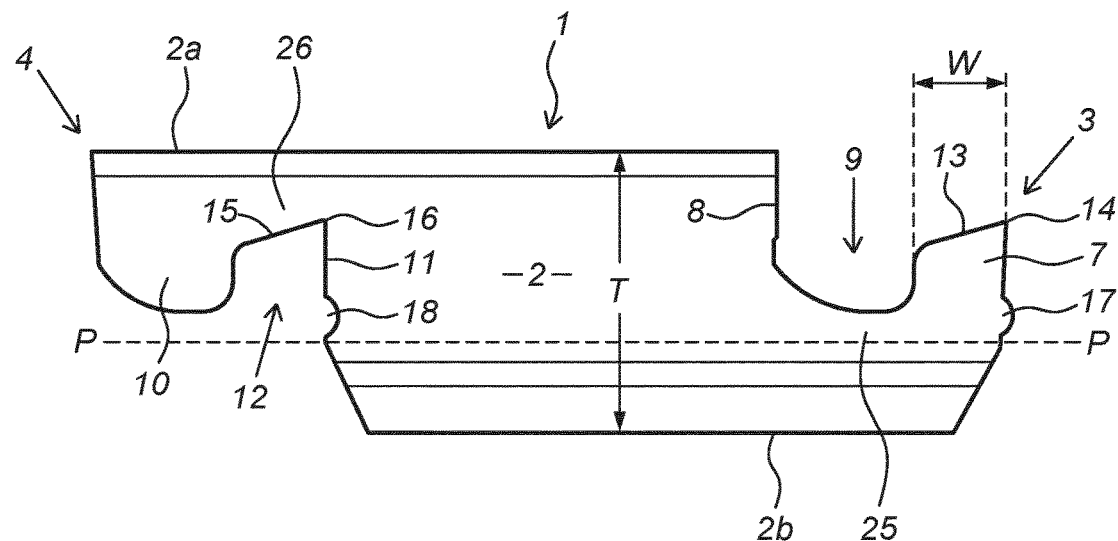
FIG. 1 schematically shows a panel according to the invention with a closed groove configuration.

FIG. 1 schematically shows an embodiment according to the invention, of a floor panel (1) comprising a centrally located core (2) provided with an upper side (2a) and a lower side (2b), which core (2) defines a plane (P); wherein the distance between the upper side (2a) and the lower side (2b) defines a thickness (T) of the panel (1). The panel (1) is provide with a first coupling part (3) and a second coupling part (4) arranged on opposite sides of the core (2), wherein the first coupling part (3) and the second coupling part (4) of another panel (1) are arranged to be coupled with a downward or vertical motion. This downward or vertical motion includes a zipping motion and/or pushing as well. This downward or vertical motion is, however, distinctive over an angling motion. In case of coupling by means of an angling motion, also referred to as turning motion or rotary motion, a (sideward) tongue is inserted into a complementary groove while the panel to be coupled is held in tilted position, and wherein the axis of rotation coincides with the said (sideward) tongue and said groove. In case of a downward or vertical motion, a downward tongue is pushed vertically into the upward groove of an adjacent panel and/or is zipped into said upward groove during lowering of said panel to be installed, wherein said panel to be installed is typically rotated around an axis of rotation which is perpendicular to longitudinal direction of the coupling parts to be coupled.

The first coupling part (3) comprises an upward tongue (7), an upward flank (8) lying at a distance from the upward tongue and an upward groove (9) formed in between the upward tongue (7) and the upward flank (8), wherein the upward groove (9) is adapted to receive at least a part of a downward tongue (10) of a second coupling part (4) of another panel (1). The side of the upward tongue (7) facing towards the upward flank (8) is the inside of the upward tongue (7) and the side of the upward tongue (7) facing away from the upward flank (8) is the outside of the upward tongue (7).

The second coupling part (4) comprises a downward tongue (10), a downward flank (11) lying at a distance from the downward tongue (10), and a downward groove (12) formed in between the downward tongue (10) and the downward flank (11), wherein the downward groove (12) is adapted to receive at least a part of an upward tongue (7) of a first coupling part (3) of another panel (1). The side of the downward tongue (10) facing towards the downward flank (11) is the inside of the downward tongue (10) and the side of the downward tongue (10) facing away from the downward flank (11) is the outside of the downward tongue (10).

The upper side (13) of the upward tongue (7) is inclined relative to the plane (P) of the panel (1), such that the upper side (13) of the upward tongue comprises a highest point (14). The upper side (15) of the downward groove (12) is also inclined relative to the plane (P) of the panel (1), such that the upper side (15) of the downward groove (12) comprises a highest point (16).

The upward tongue (7) has a width (W), as measured in the plane (P) of the panel, wherein the highest point (14) of the upward tongue (7) is arranged less than 50%, preferably less than 25% of the width from the outside of the upward tongue. The downward groove (12) also has a width, as measured in the plane (P) of the panel, wherein the highest point of downward groove (12) is arranged less than 50%, preferably less than 25% of the width from the downward flank (11).

In the shown embodiment of FIG. 1, the width (W) of the upward tongue (7) is indicated as the width, excluding additional features that may be present on the tongue (7). In FIG. 1, the outside of the upward tongue (7) is provided with a first locking element (17), and the downward flank is provided with a second locking element (18), which together co-act to lock panels (1) vertically and/or lock against rotational separation.

By providing the inclined upper side of the upward tongue (7), the upward tongue (7) is thickest at the outside of the upward tongue (7). It is typically this side of the upward tongue (7) that is most prone to damage during coupling and transportation, as it is the portion that sticks out the most. By having this side to be the thickest, a more robust coupling part (3) can be created.

Preferably, this (complete) upper surface (13) has an inclined orientation, wherein more preferably this upper surface (13) runs upwardly in a direction away from the upward flank (8). Hence, this inclined upper surface may also act as an aligning edge, which further facilitates coupling of panels. The wording "aligning edge" can be replaced by the wording "guiding edge" or "guiding surface". The upper surface of the upward tongue adjoins at an outer side surface of the upward tongue, said outer side surface being optionally provided with the first locking element. Said outer side surface preferably has a substantially vertical orientation. Thus, preferably the first locking element is located on a substantially vertical part of the upward tongue, such that above and below the locking element the upward tongue has a substantially vertically orientated surface.

The inclination of the upper surface or upper side of the upward tongue is preferably situated between 10 and 45 degrees, more preferably between 25 and 35 degrees, and is most preferably about 30 degrees, with respect to a horizontal plane or the plane (P) of the panel (1). The inclination of the upper surface of the upward tongue is preferably constant, which means the upper surface has a flat orientation. Preferably, an upper side of the downward groove has a, preferably likewise (compared to the inclination of the upper surface of the upward tongue (if applied)), inclining orientation. A lower surface of a bridge connecting the downward tongue to the core is formed by the upper surface of the downward groove.

Figure 2:
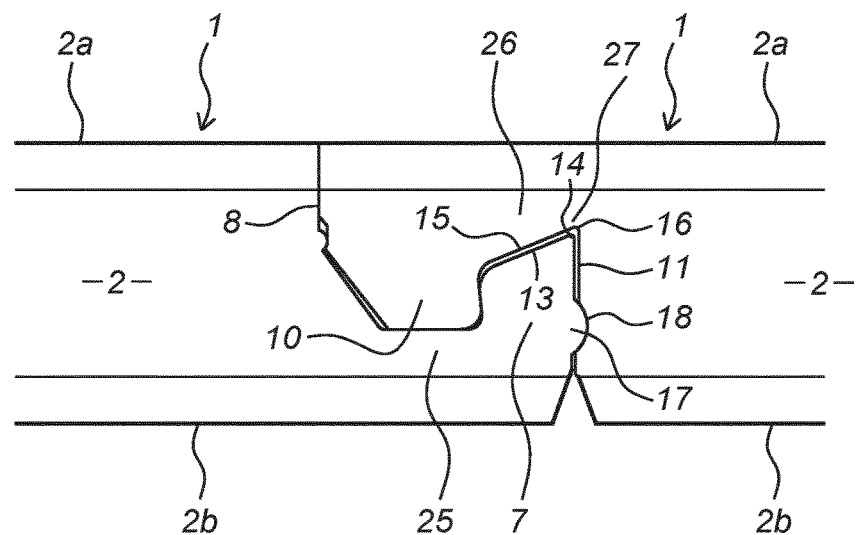
FIG. 2 schematically shows two coupled panels according to the invention with a closed groove configuration.

FIG. 2 schematically shows two panels in coupled condition, wherein the panels (1) are similar to the one shown in FIG. 1. Substantially the same or similar components compared to FIG. 1 are provided with the same reference numbers.

Both FIG. 1 and FIG. 2 shows an embodiment according to the invention in which the insides of the tongues (7, 10) are at least partially inclined towards the core (2). This creates a so-called "closed groove" system, which contributes to the locking of coupled panels (1). In order to couple or lock such "closed groove" system, typically at least one of the coupling parts (3, 4) needs to deform at least temporarily in order to create sufficient space or room for coupling. Since the upper sides (13, 15) of the upward tongue (13) and downward groove (15) have an inclined orientation, the second bridge part (26), which connects the core (2) and the downward tongue (10) has a thinnest portion, at the location where the highest point (16) of the downward groove is located. At this highest point (16) and thus the thinnest portion of the second bridge part (26), deformation is most likely to occur since at that location there is the least amount of material resisting deformation.

Since this point of deformation is located close to the downward flank, the distance between the end of outside of the downward tongue and the point of deformation is relatively large. This increased distance increases the so-called arm and therefore reduces the amount of force that needs to be exerted on the end of the second coupling part (4) to couple two panels (1). In the coupled state of adjacent floor panels (1), the upper surface of the downward groove is preferably at least partially, and preferably substantially completely, supported by the upper surface of the upward tongue, which provides additionally strength to the coupling as such. To this end, it is advantageous that the inclination of the upper surface of the downward groove substantially corresponds to the inclination of the upper surface of the upward tongue. This means that the inclination of the upper surface of the downward groove is preferably situated between 10 and 45 degrees, more preferably between 25 and 35 degrees, and is most preferably about 30 degrees, with respect to a horizontal plane or the plane (P) of the panel (1). As already mentioned, this inclination may be either flat or rounded, or eventually hooked. In FIG. 2, an embodiment is shown with a small gap between the inclined parts.

FIGS. 3-7 show embodiments according to the invention similar to FIGS. 1 and 2. Again, substantially the same or similar components compared to FIGS. 1 and 2 are provided with the same reference numbers. FIGS. 3, 4, 5, and 7 all shows so-called "closed groove" systems, similar to FIGS. 1 and 2.

Figure 3:
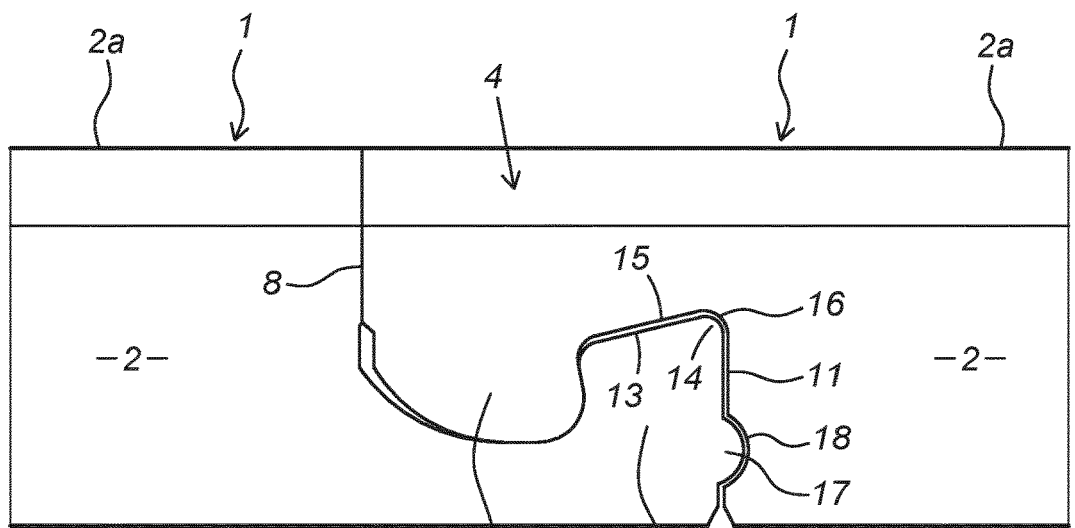
FIG. 3 schematically shows two coupled panels according to the invention with a closed groove configuration.

FIG. 3 differs from FIG. 1 for instance in that the transition between the upper side (16) of the downward groove (12) and the downward flank (11) is rounded or curved, wherein the same applies to the transition between the upper side (13) of the upward tongue (7) and the outside of the upward tongue (7).

Figure 4:
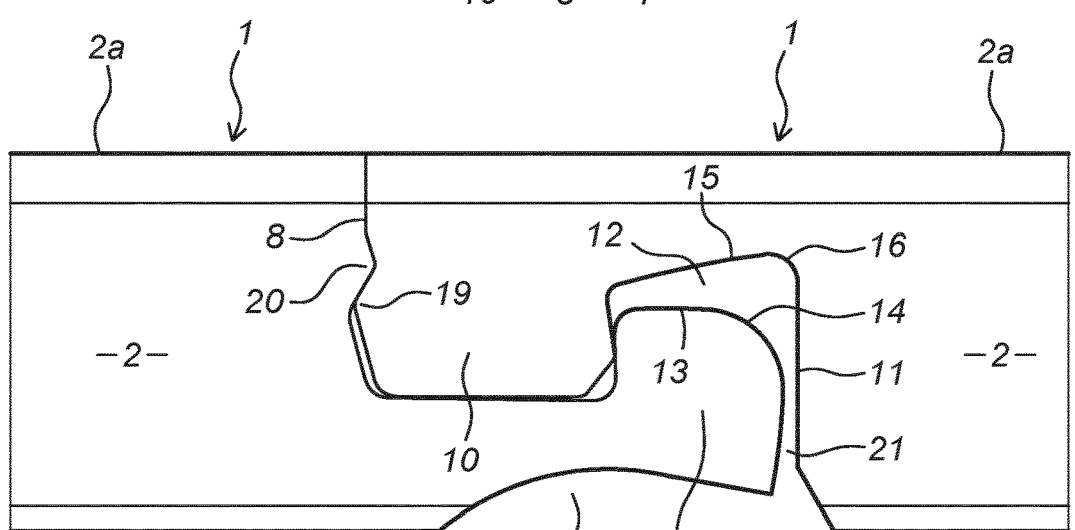
FIG. 4 schematically shows two coupled panels according to the invention with a closed groove configuration.
Figure 5:
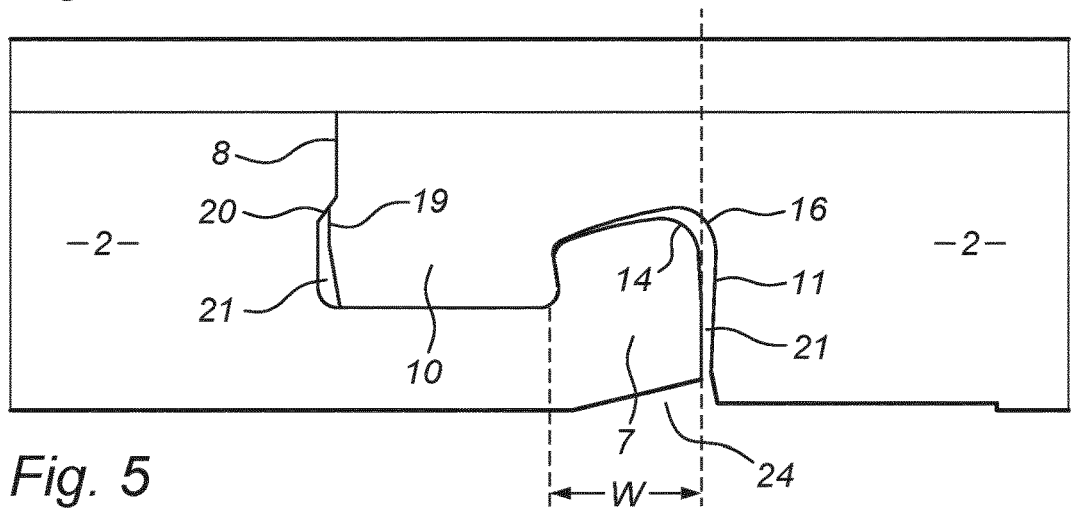
FIG. 5 schematically shows two coupled panels according to the invention with a closed groove configuration.

FIGS. 4 and 5 show embodiments according to the invention wherein the outside of the downward tongue (10) is provided with a third locking element (19) and the upward flank (8) is provided with a fourth locking element (20). In this embodiment, the outside of the upward tongue (7) and the downward flank (11) are not provided with locking elements, although these elements can be provided with the locking elements as shown in FIGS. 1-3 as well, in addition to the shown third and fourth locking elements (19, 20). Between the outside of the upward tongue (7) and the downward flank (11) an intermediate space is shown. In FIG. 4, the upward tongue (7) is shown in a bended orientation. This bended state provides an active locking force, actively pushing the two panels (1) together. This bending of the upward tongue (7) results in that the upper side (13) of the upward tongue (7) appears to be horizontal. To facilitate the downward bending of the upward tongue (7), a space (24) is provided underneath the upward tongue (7). This space is also present in FIG. 5.

Figure 6:
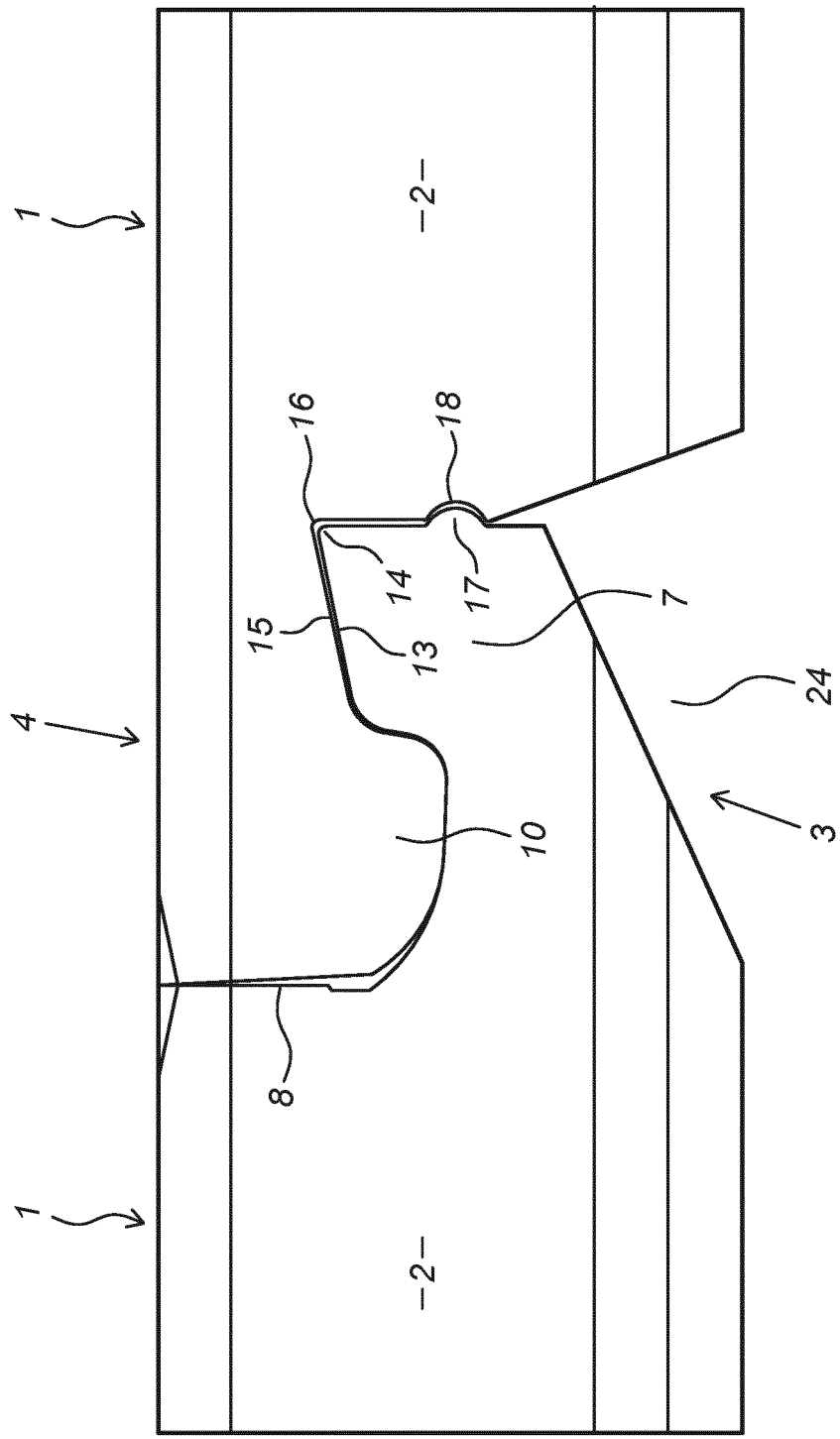
FIG. 6 schematically shows two coupled panels according to the invention with a closed groove configuration.

FIG. 6 shows an embodiment similar to FIGS. 1 and 2, but also provided with the space (24) underneath the upward tongue (7) and optionally also underneath at least a part of the bridge part connecting the upward tongue (7) and the core (2). In the FIG. 6 embodiment, the outside of the downward tongue (10) is angled compared to the downward flank (8), which creates a gap between the two panels (1) in coupled condition. The mutual angle enclosed may lie between 0 and 10 degrees, preferably between 0 and 5 degrees, typically about 2 to 3 degrees.

Figure 7:
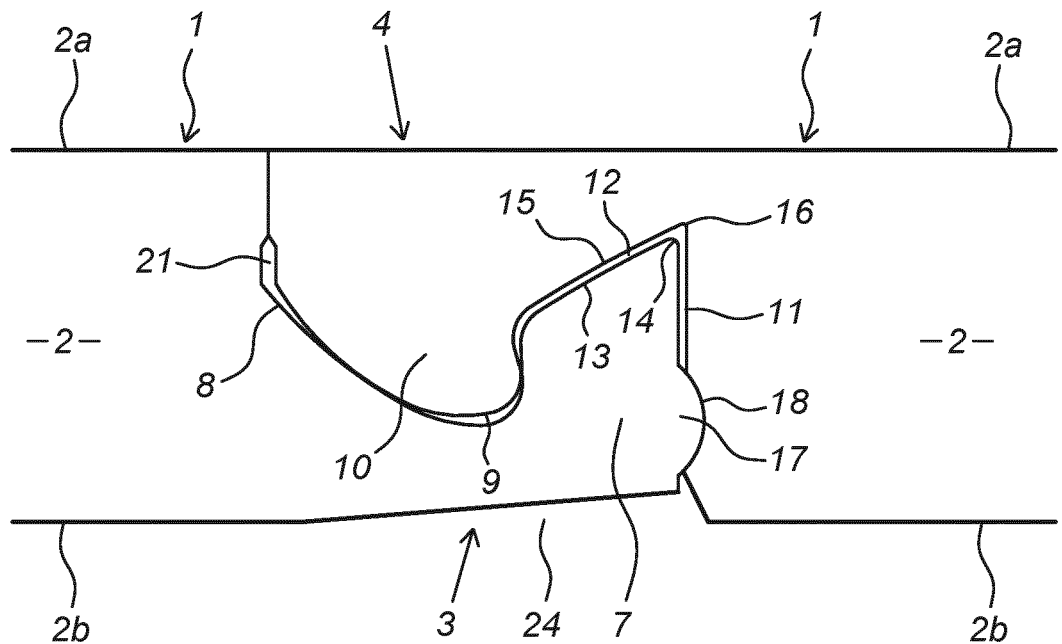
FIG. 7 schematically shows two coupled panels according to the invention with a closed groove configuration.

FIG. 7 shows an embodiment in which the inclination of the upper sides (13, 15) of both the upward tongue (7) and downward groove (12) is more compared to the inclination of the earlier figures, resulting in a steeper angle. Additionally, the downward tongue (10) in FIG. 6 is shaped differently, wherein the outside of the downward tongue had a somewhat larger inclination than shown in the earlier figures. Similarly to FIGS. 4 and 5, a space (24) is arranged underneath the upward tongue (7).

Figure 8:
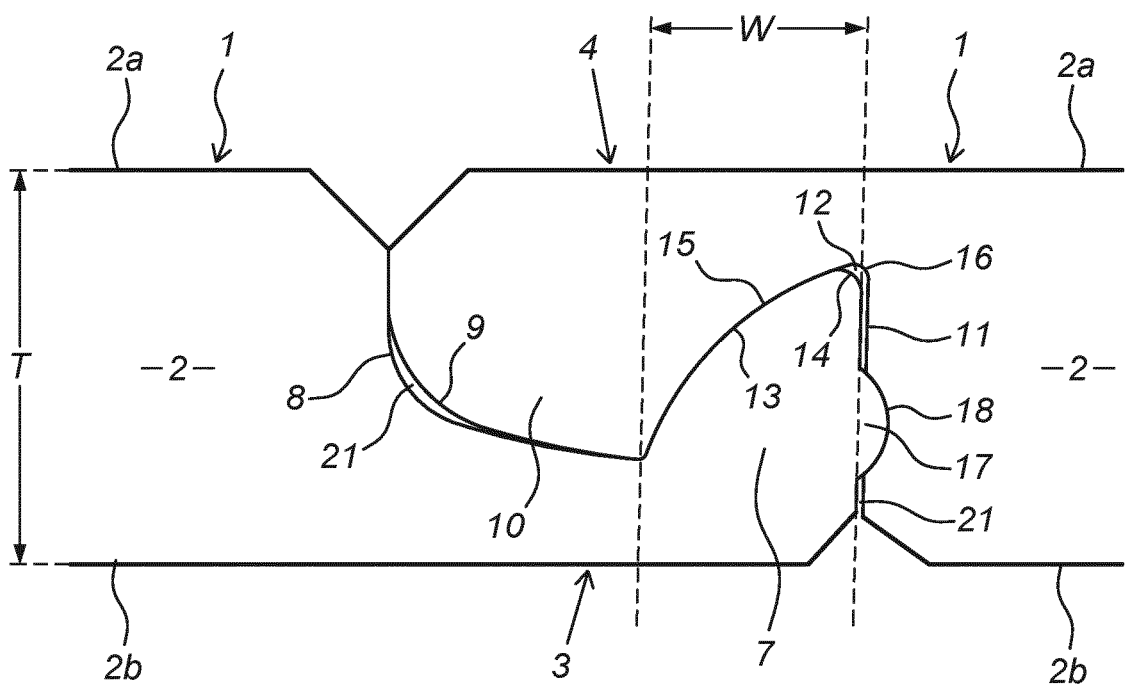
FIG. 8 schematically shows two coupled panels according to the invention in an open groove configuration.

FIG. 8 shows an embodiment which differs from the earlier embodiments in that a so-called "open-groove" system is shown. The insides of the tongues (7, 10) are inclined away from the core (2), instead of towards. Such "open groove" system is easier to couple or connect compared to a "closed groove" system, but does not provide the same locking effect. As shown in FIG. 8, the width (W) of the upward tongue (7) is measured from the point where a transition can be observed from the upward groove, upwardly, to the upward tongue. In this "open groove" system, this is for instance the lowest point of the groove, or the location with the sharpest transition in curve, from the upward groove towards the upper side or outside of the upward tongue.

Figure 9:
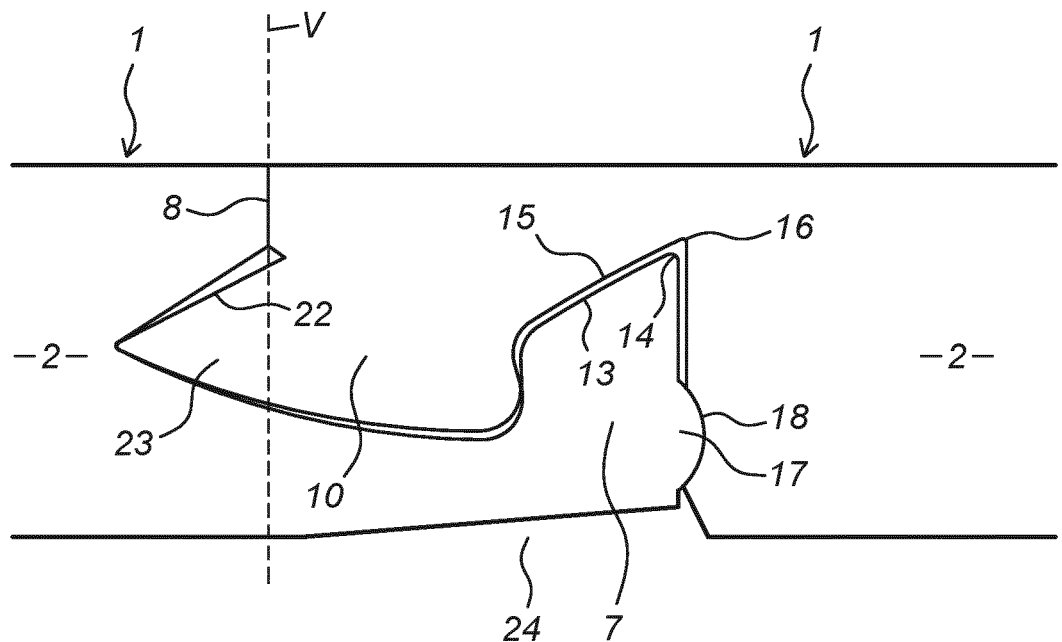
FIG. 9 schematically shows two coupled panels according to the invention with a closed groove configuration.
Figure 10:
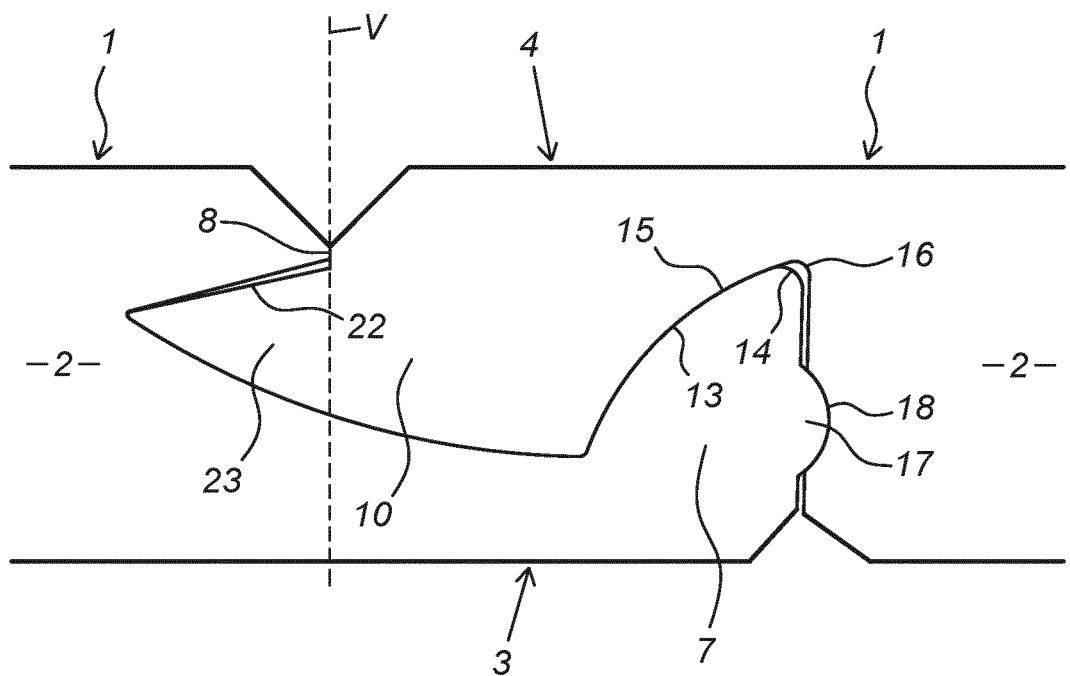
FIG. 10 schematically shows two coupled panels according to the invention in an open groove configuration

FIGS. 9 and 10 show two modified versions, of FIGS. 7 and 8 respectively. In both embodiments, the downward tongue (10) is further provided with a sideward tongue (23), and wherein the upward flank (8) is provided with a sideward groove (22), for accommodating the sideward tongue (23). In both embodiments, this allows the two panels (1) to be coupled by a turning, pivoting or angling motion, wherein the sideward tongue is placed partly into the sideward groove at an angle, and the panels are mutually angled. Since the upper side of the upward tongue is inclined, and increases in size towards the outside of the tongue, the thickest portion of the upward tongue may be encountered relatively late in the angling process, which facilitates coupling. As indicated in FIGS. 9 and 10, this applies to both the "closed groove" system (as shown in FIG. 9) and the "open groove" system (as shown in FIG. 10). To facilitate the coupling in the "closed groove" system as shown in FIG. 9, a space (24) may be present beneath the upward tongue (7).

To distinguish the sideward tongue (23) and sideward groove (22) from the downward tongue (10) and upward flank (8), a vertical plane (V) can be used. At the top of the connection of two panels (1), the panels (1) touch. At that point, a (virtual) vertical line (V) can be drawn, or a line perpendicular to the plane (P) of the panel. Any part protruding from that line can be considered to be part of the sideward tongue (23) or groove (22).

Hence, the above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application. It is, for example, conceivable that features or elements of the angling or open groove system can be applied to the drop-lock or closed groove system or vice versa. It will be apparent that the invention is not limited to the working examples shown and described herein, but that numerous variants are possible within the scope of the attached claims that will be obvious to a person skilled in the art. The verb "comprise" and conjugations thereof used in this patent publication are understood to mean not only "comprise", but are also understood to mean the phrases "contain", "substantially consist of", "formed by" and conjugations thereof.

The invention claimed is:
1. A panel, a floor panel or a wall panel, comprising:
a centrally located core provided with an upper side and a lower side, the centrally located core defining a plane; wherein a distance between the upper side and the lower side defines a thickness of the panel;

at least one first coupling part and at least one second coupling part arranged on opposite sides of the centrally located core, wherein the first coupling part and the second coupling part of another panel are configured to be coupled with a downward or vertical motion;

wherein the first coupling part comprises an upward tongue, at least one upward flank lying across from the upward tongue and an upward groove formed in between the upward tongue and the upward flank, wherein the upward groove is adapted to receive at least a part of a downward tongue of a second coupling part of another panel, wherein a side of the upward tongue facing towards the upward flank is the inside of the upward tongue and the side of the upward tongue facing away from the upward flank is the outside of the upward tongue;

wherein the second coupling part comprises a downward tongue, at least one downward flank lying at across from the downward tongue, and a downward groove formed in between the downward tongue and the downward flank, wherein the downward groove is adapted to receive at least a part of an upward tongue of a first coupling part of another panel, wherein the side of the downward tongue facing towards the downward flank is the inside of the downward tongue and the side of the downward tongue facing away from the downward flank is the outside of the downward tongue;

wherein at least a part of the inside of the upward tongue is inclined towards the upward flank, and at least a part of the inside of the downward tongue is inclined towards the downward flank, and wherein at least a part of an upper side of the upward tongue is inclined relative to the plane of the panel, such that the upper side of the upward tongue comprises a highest point, and wherein at least a part of an upper side of the downward groove is inclined relative to the plane of the panel, such that the upper side of the downward groove comprises a highest point; and wherein the upward tongue has a minimum, average or maximum width, as measured in the plane of the panel, wherein the highest point of the upward tongue is arranged less than 50%, and wherein the downward groove has a minimum, average or maximum width, as measured in the plane of the panel, wherein the highest point of downward groove is arranged less than 50%.

2. The panel according to claim 1, wherein the highest point of the upward tongue is closer to the outside of the upward tongue than the inside of the upward tongue and/or wherein the highest point of the downward groove is closer to the downward flank than to the inside of the downward tongue.

3. The panel according to claim 1, wherein a distance, in the plane of panels, between the highest point of the upward tongue and the outside of the upward tongue and/or a distance, in the plane of panels, between the highest point of the downward groove and the downward flank, is less than 0.1 times the thickness of the panel.

4. The panel according to claim 1, wherein the upper side of the upward tongue is arranged between the inside and the outside of the upward tongue, and wherein the inclined part of the upper side of the upward tongue is a straight part.

5. The panel according to claim 1, wherein at least a part of the inside of the upward tongue is inclined away from the upward flank, wherein the angle of inclination lies between 0.5 and 10 degrees, wherein the angle is measured compared to a direction perpendicular to the plane of the panel.

6. The panel according to claim 1, wherein the outside of the upward tongue comprises a first locking element and/or wherein the downward flank is provided with a second locking element, wherein preferably the first and second locking elements are adapted for co-action.

7. The panel according to claim 1, wherein the outside of the downward tongue comprises a third locking element and/or wherein the upward flank comprises a fourth locking element, wherein preferably the third and fourth locking elements are adapted for co-action.

8. The panel according to claim 1, wherein the transition between the highest point of the upward tongue and the outside of the upward tongue is rounded and/or the transition between the highest point of the downward groove and the downward flank is rounded.

9. The panel according to claim 1, wherein in coupled condition a number of gaps are present between the panels, selected from a group of:
    a) a gap between the outside of the downward tongue and the upward flank;
    b) a gap between the outside of the upward tongue and the downward flank;
    c) a gap between the upward tongue and the downward groove;
    d) a gap between the downward tongue and the upward groove;
    e) a gap between the highest point of the upward tongue and the highest point of the downward groove;
    f) a gap underneath the upward tongue, extending towards the downward flank.

10. The panel according to claim 1, wherein the core comprises a composite material, selected from the group of:
    a) a mineral material and a synthetic material wherein the amount of mineral material is at least 50% of the core material
    b) a filler material and a synthetic material wherein the amount of filler material is at least 50% of the core material;
    c) an extruded composite, wherein two different materials are mixed and then extruded.

11. The panel according to claim 10, wherein the mineral material is magnesium oxide based and the synthetic material comprises a thermoplastic material, wherein the amount of mineral material is at least 60% of the core material.

12. The panel according to claim 10, wherein the filler material comprises chalk or dust, and the synthetic material comprises a thermoplastic material, wherein the amount of filler material is at least 60% of the core material.

13. The panel according to claim 1, wherein the first coupling part comprises a first bridge part, arranged between the core and the upward tongue, and wherein the second coupling part comprises a second bridge part, arranged between the core and the downward tongue, wherein the first bridge part comprises a weakened zone of reduced thickness, to facilitate deformation of the first bridge part during coupling and/or wherein the second bridge part comprises a weakened zone of reduced thickness, to facilitate deformation of the second bridge part during coupling, wherein the second bridge part is thinnest closest to the core.

14. The panel according to claim 1, wherein the outside of the upward tongue is located at a distance, measured in the plane of the panel, from the upward flank, wherein the distance is less than the thickness of the core.

15. The panel according to claim 1, wherein the panel is elongated, and wherein the first and second coupling parts are present on the short sides of the panel, wherein the long sides are provided with an angling down locking profile or are also provided with the first and second coupling parts.

16. The panel according to claim 1, wherein the highest point of the upward tongue is closer to the outside of the upward tongue compared to the upward groove and/or wherein the highest point of the downward groove is closer to the downward flank compared to the downward tongue.

17. The panel according to claim 1, wherein the upward flank is provided with a substantially sideward groove for accommodating a sideward tongue and/or wherein the outside of the downward tongue is provided with a sideward tongue arranged to be accommodated in a sideward groove.

18. The panel according to claim 1, wherein the width of the upward tongue is smaller than the width, the maximum width, of the upward groove enclosed by the inside of the upward tongue and the upward flank.

19. The panel according to claim 1, wherein the width of the downward tongue is larger than the width, the maximum width, of the downward groove enclosed by the inside of the downward tongue and the downward flank.

20. A covering, the covering comprising a floor covering, ceiling covering, or wall covering, comprising a plurality of mutually coupled panels according to claim 1.

* * * * *